United States Patent
Li et al.

(10) Patent No.: US 9,240,033 B2
(45) Date of Patent: Jan. 19, 2016

(54) IMAGE SUPER-RESOLUTION RECONSTRUCTION SYSTEM AND METHOD

(71) Applicant: SHENZHEN CHINA STAR OPTOELECTRONICS TECHNOLOGY CO., LTD., Shenzhen, Guandong (CN)

(72) Inventors: Hao Li, Shenzhen (CN); Yu-Yeh Chen, Shenzhen (CN); Li-Wei Chu, Shenzhen (CN); JhenWei He, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/241,413

(22) PCT Filed: Jan. 24, 2014

(86) PCT No.: PCT/CN2014/071392
§ 371 (c)(1),
(2) Date: Feb. 26, 2014

(87) PCT Pub. No.: WO2015/032185
PCT Pub. Date: Mar. 12, 2015

(65) Prior Publication Data
US 2015/0093039 A1 Apr. 2, 2015

(30) Foreign Application Priority Data

Sep. 9, 2013 (CN) .......................... 2013 1 0409004

(51) Int. Cl.
*G06K 9/40* (2006.01)
*G06T 3/40* (2006.01)

(52) U.S. Cl.
CPC .............. *G06T 3/4053* (2013.01); *G06T 3/403* (2013.01)

(58) Field of Classification Search
None
See application file for complete search history.

(56) References Cited

U.S. PATENT DOCUMENTS

| | | | |
|---|---|---|---|
| 5,054,100 A * | 10/1991 | Tai | 382/300 |
| 6,236,766 B1 * | 5/2001 | Zavaljevski et al. | 382/300 |
| 8,351,725 B2 * | 1/2013 | Pan et al. | 382/260 |
| 2002/0093587 A1 * | 7/2002 | Michel | 348/452 |
| 2007/0092156 A1 * | 4/2007 | Yamanaka et al. | 382/274 |
| 2010/0086229 A1 * | 4/2010 | Jeon et al. | 382/264 |
| 2012/0099018 A1 * | 4/2012 | Kubo et al. | 348/441 |
| 2013/0051702 A1 * | 2/2013 | Chien et al. | 382/300 |
| 2013/0051703 A1 * | 2/2013 | Bernard | 382/300 |
| 2013/0182945 A1 * | 7/2013 | Kim et al. | 382/154 |
| 2014/0146139 A1 * | 5/2014 | Schwartz et al. | 348/43 |

OTHER PUBLICATIONS

Kriener et al, Mutual Exclusion by Interpolation, Functional and Logic Programming Lecture Notes in Computer Science vol. 7294, 2012, pp. 182-196.*
Schwartz et al, Depth map upscaling through edge-weighted optimization, Proc. SPIE 8290, Three-Dimensional Image Processing (3DIP) and Applications II, 829008 (Feb. 9, 2012).*
Jin, Soonjong, Wonki Kim, and Jechang Jeong. "Fine directional de-interlacing algorithm using modified Sobel operation." Consumer Electronics, IEEE Transactions on 54.2 (2008): 587-862.*
Zhang, Xiong et al.; "An Edge Preserved Image Interpolation Method", Journal of Airforce Engineering University (Natural Science Edition), No. 3, vol. 8, Jun. 30, 2007.
International Search Report dated Jun. 10, 2014, issued to PCT/CN2014/071392.

* cited by examiner

*Primary Examiner* — Andrae S Allison
(74) *Attorney, Agent, or Firm* — Stein IP, LLC

(57) ABSTRACT

The present disclosure discloses an image super-resolution reconstruction method, comprising the steps of: performing an edge detection on low-resolution images to be processed to obtain edge pixel frames, amplifying the edge pixel frames so that each amplified image is the double of the original edge pixel frame in size in both horizontal direction and vertical direction, without changing the detected edge pixel information, and compensating for the interpolated interpolation pixels according to different pixel edges to obtain a high-resolution image. The method can ensure the definition and integrity of the edges, and enhance the contrast without degrading image quality. At last, the previous interpolation pixels are compensated according to optimized rules, during which influences of edge pixels and surrounding pixels are comprehensively considered, so as to eliminate the sawtooth phenomenon of the output image.

12 Claims, 6 Drawing Sheets

IMAGE SUPER-RESOLUTION RECONSTRUCTION SYSTEM AND METHOD

FIELD OF THE INVENTION

The present disclosure relates to the high-resolution display, in particular, to an image super-resolution reconstruction system and a method.

BACKGROUND OF THE INVENTION

With the increasing market demand, higher-end display equipment is needed in the field of high-end display particularly. Display resolution and display equipment dimension are gradually increased from the initial 480P kinescope televisions to subsequent display equipment with resolutions of 720P, FHD (full high definition), 2K, 4K, 8K, and the like.

In order to reduce the cost for running system and improve image quality, super resolution (SR) algorithms become current mainstream algorithms in the field of high-end display (for example, 4K2K), which means an operation for recovering low-resolution images or image sequences into high-resolution images.

The super resolution algorithms, which are technologies for enhancing the resolution of an image or a video, are designed for obtaining a clear high-resolution (HR) image from one or more low-resolution (LR) images by virtue of a corresponding algorithm. That is, the SR algorithms aim at causing the resolution of the output image or video to be higher than the resolution of any input image or any frame of the input video. The obtained HR image here means that the image has a high pixel density, and can provide more details.

However, with respect to actual product applications, most of the present SR algorithms have the defect of a high calculated amount, resulting in increased cost and low practicability, no that the present SR algorithms do not be applied to commercial video products. On the other hand, simple and rapid SR algorithms such as an adjacent substitution algorithm, a bilinear interpolation algorithm, a Hermite interpolation algorithm, and a Canny interpolation algorithm may cause the defects of sawtooth, blurring and the like on images.

Therefore, one of the tasks dedicated in the industry is to solve the above problems, so that the defects of sawtooth on an output image are obviously alleviated by a simple and fast algorithm, and thus the cost is reduced.

SUMMARY OF THE INVENTION

One of the technical problems to be solved by the present disclosure is to provide an image super-resolution reconstruction method, so as to output a high-resolution image with obviously alleviated sawtooth by a simple and fast algorithm, and thus reducing the cost of the display. In addition, the present disclosure further provides an image super-resolution reconstruction system.

1) In order to solve the aforementioned technical problems, the present disclosure provides an image super-resolution reconstruction method, comprising: an edge detection step of performing an edge detection on low-resolution images to be processed to obtain edge pixel frames, a frame amplification step of amplifying the edge pixel frames so that each amplified image is the double of the original edge pixel frame in size in both horizontal direction and vertical direction, without changing the detected edge pixel information, and a pixel compensation step of compensating for the interpolated interpolation pixels according to different pixel edges to obtain a high-resolution image.

2) In a preferred embodiment of item 1), in the edge detection step, the edges of each low-resolution image to be processed are further detected from four different directions by adopting a Sobel operator.

3) In a preferred embodiment of item 1) or 2), the pixel compensation step further includes:

searching, based on the central interpolation pixel in five interpolation pixels to be compensated which is located at the center of a pixel block, the information of the edge pixels contained in the four pixels adjacent to the central interpolation pixel in the set four directions, and then compensating for the five interpolation pixels according to corresponding rules, wherein the rules are related to the number of the edge pixels contained in the four pixels, the edge directions, and/or brightness of the pixels.

4) In a preferred embodiment of any one of item 1) to 3), the rules comprise: if all the four pixels are edge pixels, the edges are in diagonal directions, and the difference of brightness between the two pixels in the edge directions and the other pixel is less than a set threshold value, then the interpolation compensation is performed by virtue of the following steps:

assigning the average of brightness values of the three pixels to the central interpolation pixel located at the center of the pixel block; assigning the brightness value of other pixel except the three pixels to the two interpolation pixels adjacent to the other pixel; and assigning the average of brightness values of each of the two pixels in the edge directions and the other pixel to the interpolation pixel therebetween.

5) In one preferred embodiment of any one of item 1) to 4), the rules comprise: if all the four pixels are edge pixels, the difference of brightness values between the two pixels in each row is less than a set threshold value, and the difference of the averages of brightness values of the two adjacent rows is greater than the set threshold value, then the interpolation compensation is performed by virtue of the following steps:

assigning the brightness average of two pixels in each row to the interpolation pixels in the corresponding row; assigning the brightness average of two pixels in the lower row to the central interpolation pixel located at the center of the pixel block; and assigning the brightness value of each pixel in the two pixels in the lower row to the interpolation pixels in the column where each pixel is located.

6) In a preferred embodiment of any one of item 1) to 5), the rules comprise: if all the four pixels are edge pixels, and the difference between brightness values of the two pixels in each column is less than a set threshold value and the difference of the brightness averages of the left column and the right column is greater than the set threshold value, then the interpolation compensation is performed by virtue of the following steps:

assigning the brightness average of two pixels in each column to the interpolation pixels in the column; assigning the brightness average of two pixels in the left column to the central interpolation pixel located at the center of the pixel block; assigning the brightness value of each pixel in the two pixels in the left column to the interpolation pixels in the row where the pixel is located.

7) In a preferred embodiment of any one of item 1) to 6), the rules comprise: if all the four pixels are edge pixels, and the difference between the brightness values of the four pixels is less than a set threshold value or greater than the set threshold value, then the interpolation compensation is performed by virtue of the following steps:

assigning the average of the brightness values of two pixels in each column to the interpolation pixels in the column; assigning the average of the brightness values of two pixels in each row to the interpolation pixels in the row; and assigning the average of the brightness values of the four pixels to the central interpolation pixel located at the center of the pixel block.

8) In a preferred embodiment of any one of item 1) to 7), the rules comprise: if the number of edge pixels in the four pixels is three, and the edges are in a diagonal direction, then the interpolation compensation is performed by virtue of the following steps:

assigning the average of the brightness values of the three pixels to the central interpolation pixel located at the center of the pixel block; assigning the brightness values of other non-edge pixel except the three pixels to the two interpolation pixels adjacent to the non-edge pixel; and assigning the average of the brightness values of each of the two pixels in the edge directions and another edge pixel except the two edge pixels to the interpolation pixels therebetween.

9) In a preferred embodiment of any one of item 1) to 8), the rules comprise: if the number of edge pixels in the four pixels is two, and the edges are in a diagonal direction, then the interpolation compensation is performed by virtue of the following steps:

assigning the average of the brightness values of the two edge pixels to the central interpolation pixel located at the center of the pixel block; and assigning the brightness value of each of the other two non-edge pixels to the interpolation pixels adjacent to the non-edge pixel.

10) In a preferred embodiment of any one of item 1) to 9), the rules comprise: if the number of edge pixels in the four pixels is two, and the edges are in directions of columns, then the interpolation compensation is performed by virtue of the following steps:

assigning the brightness average of the two edge pixels to the interpolation pixels in the column where the two pixels are located; assigning the average of brightness values of other two non-edge pixels to the central interpolation pixel located at the center of the pixel block; and assigning the brightness value of each of the other two non-edge pixels to the interpolation pixels adjacent to the non-edge pixel.

11) In a preferred embodiment of any one of item 1) to 10), the pixel compensation step further includes: recording the five interpolation pixels after interpolation compensation every time, selecting set directions so as to conduct a mutual exclusivity analysis, for judging whether the assigned values to the five interpolation pixels currently compensated are mutually exclusive with the assigned values previously compensated, and processing the interpolation pixels which are mutually exclusive.

12) In a preferred embodiment of any one of item 1) to 11), when the set directions are selected in a range from 45° to 90°, if the assigned value to one of the five interpolation pixels currently compensated is also from interpolation pixels previously compensated, and the pixel block compensated previously is located above the interpolation pixel, then the assigned value of the interpolation pixel is the value currently compensated; and, if the assigned value to one of the five interpolation pixels currently compensated is also from one of interpolation pixels previously compensated, and the pixel block compensated previously is located at the left side of the interpolation pixel, then the assigned value of the interpolation pixel is the value previously compensated.

13) In a preferred embodiment of any one of item 1) to 12) when the set directions are selected in a range from 90° to 180°, if the assigned value to one of the five interpolation pixels currently compensated is also from one of interpolation pixels previously compensated, and the pixel block compensated previously is located above the interpolation pixel, then the assigned value of the interpolation pixel is the value previously compensated; and if the assigned value to one of the five interpolation pixels currently compensated is also from one of interpolation pixels previously compensated, and the pixel block compensated previously is located at the left side of the interpolation pixel, then the assigned value of the interpolation pixel is the value currently compensated.

14) In a preferred embodiment of any one of item 1) to 13), when the set directions are selected from outside of a range of 45° to 180°, if the assigned value to one of the five interpolation pixels currently compensated is also from one of interpolation pixels previously compensated, and the pixel block compensated previously is located above or at the left side of the interpolation pixel, then the assigned value of the interpolation pixel is the value previously compensated.

15) A preferred embodiment of any one of item 1) to 14) further includes a step of compensating for the remaining interpolation pixels by adopting a bicubic interpolation method.

16) according to another aspect of the present disclosure, there is provided an image super-resolution reconstruction system, comprising: an edge detection means, for performing an edge detection on low-resolution images to be processed to obtain edge pixel frames; a frame amplification means for amplifying the edge pixel frames so that each amplified image is the double of the original edge pixel frame in size in both horizontal direction and vertical direction, without changing the detected edge pixel information, and a pixel compensation means for compensating for the interpolated interpolation pixels according to different pixel edges to obtain a high-resolution image.

17) In a preferred embodiment of item 16), the edge detection means further detect the edges of each low-resolution image to be processed from four different directions by adopting a Sobel operator.

18) In a preferred embodiment of item 16) or 17), the pixel compensation means further searches, based on the central interpolation pixel in five interpolation pixels to be compensated which is located at the center of a pixel block, the information of the edge pixels contained in the four pixels adjacent to the central interpolation pixel in the set four directions, and then compensating for the five interpolation pixels according to corresponding rules, wherein the rules are related to the number of the edge pixels contained in the four pixels, the edge directions, and/or brightness of the pixels.

19) In a preferred embodiment of any one of item 16) to 18), the pixel compensation means further records the five interpolation pixels compensated every time, selects set directions so as to conduct a mutual exclusivity analysis, for judging whether the assigned values to the five interpolation pixels currently compensated are mutually exclusive with the assigned values previously compensated, and processing the interpolation pixels which are mutually exclusive.

Compared with the prior art, one or more examples of the present disclosure may have the following advantages:

According to the method disclosed by the present disclosure, the edge detection is firstly performed on the images. Then, the frame pictures of the edge images are amplified to the double of the original images in size, with the interpolated pixel parts being replaced with 0 grey scales and the edge pixel information being simply reserved. The above process can ensure the definition and integrity of the edges, and enhance the contrast without degrading image quality. At last, the above compensated 0 grey-scale pixels are compensated according to optimized rules, during which influences of edge pixels and surrounding pixels are comprehensively considered.

Other features and advantages of the present disclosure will be illustrated in the following description, and are partially obvious from the description or understood through implementing the present disclosure. The objectives and other advantages of the present disclosure may be realized and obtained through the structures specified in the description, claims and accompanying drawings.

BRIEF DESCRIPTION OF THE DRAWINGS

The accompanying drawings are provided for further understanding of the present disclosure, and as a part of the description, for illustrating the present disclosure together with the examples of the present disclosure, rather than limiting the present disclosure, in which.

DETAILED DESCRIPTION OF THE EMBODIMENTS

The embodiment methods of the present disclosure are illustrated in detail below in conjunction with the accompanying drawings and examples, thereby understanding and implementing the present disclosure for solving the technical problems by using technical means in the present disclosure and achieving its technical effects. It should be explained that as long as conflicts do not exist, all examples and all technical features in all the examples of the present disclosure may be combined together, and the formed technical solutions are all fallen in the scope of the present disclosure.

In addition, the steps shown in the flow chart of the accompany drawings can be executed in a computer system with a set of computer executable instructions stored thereon. Although a logic sequence is shown in the flow diagrams, in some situations the steps shown or described can be executed in a sequence different from the logic sequence.

In order to eliminate image sawtooth and avoid blurring of edges thereof, that is, to make outlines of the images clear, the present disclosure discloses a method capable of obviously alleviating the sawtooth phenomenon of the output image. The method is simple in calculation, fast in running speed, and effectively reduced cost.

The method of the present disclosure is illustrated by taking amplification conversion from resolution FHD to resolution 4K2K as an example, wherein, "FHD", as the abbreviation of fullHD (Full High Definition), has a resolution of 1920×1080, and '4K2K' has a resolution of 3840×2160 and is the double of the common FHD in width and height respectively and the quadruple of the common FHD in area. It is easy to understand that the description is only for illustrating, the method disclosed herein can be utilized by those skilled in the art according to actual needs, and any other application are encompassed in the scope of the present disclosure. In addition, the figures are only for the purpose of illustration and are not drawn according to the original dimensions.

It should be noted that directional terms referred in this application, such as upper, lower, left, right, and upper left are merely directions with reference to the accompanying drawings. Therefore, the adopted directional terms are used for illustrating rather than limiting the scope of the application.

Figure 1:
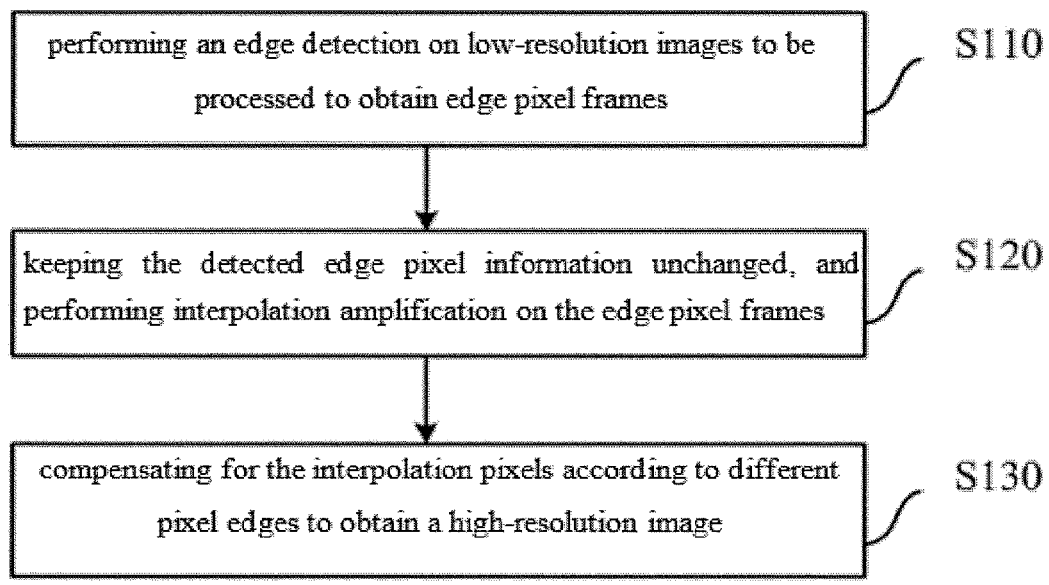
FIG. 1 is a flow chart of the image super-resolution reconstruction method according to an example of the present disclosure.

FIG. 1 is a flow chart showing the image super-resolution reconstruction method according to an example of the present disclosure. Each step of the method is illustrated in detail below with reference to FIG. 1.

In step S110, edge detection is performed on low-resolution images to be processed to obtain edge pixel frames.

Particularly, the edges of each FHD images to be processed in four different directions are detected by virtue of a Sobel operator (Sobel covering operator).

In consideration of the complexity and system cost of hardware realization, in one example, the detection is preferably performed in four directions of 0°, 45°, 90° and 135°, and the structures of detection operators are as shown below.

$$\text{Sobel\_h} = \begin{Bmatrix} -1 & -2 & -1 \\ 0 & 0 & 0 \\ 1 & 2 & 1 \end{Bmatrix}(a) \quad \text{Sobel\_dl} = \begin{Bmatrix} 0 & 1 & 2 \\ -1 & 0 & 1 \\ -2 & -1 & 0 \end{Bmatrix}(b)$$

$$\text{Sobel\_v} = \begin{Bmatrix} -1 & 0 & 1 \\ -2 & 0 & 2 \\ -1 & 0 & 1 \end{Bmatrix}(c) \quad \text{Sobel\_dr} = \begin{Bmatrix} 2 & 1 & 0 \\ 1 & 0 & -1 \\ 0 & -1 & -2 \end{Bmatrix}(d)$$

wherein, formula (a) is an operator in the horizontal direction, formula (b) is an operator in a direction of 45°, formula (c) is the operator in a vertical direction, and formula (d) is the operator in a direction of 135°.

By taking the centre of a 3×3 display matrix as a detection object, the covering operators are respectively multiplied with the brightness values of the pixels and then added together. Then, the results are compared to determine the direction with the maximum value. Finally, a threshold value is set and compared with the maximum value. If the value is greater than the threshold value, then the pixel is an edge pixel. Otherwise, the pixel is a pseudo-edge pixel.

In step S120, the edge pixel frames are amplified so that the dimension of each amplified image is the double of the original edge pixel frame in both the horizontal direction and the vertical direction, without changing information about the detected edge pixel.

Figure 2:
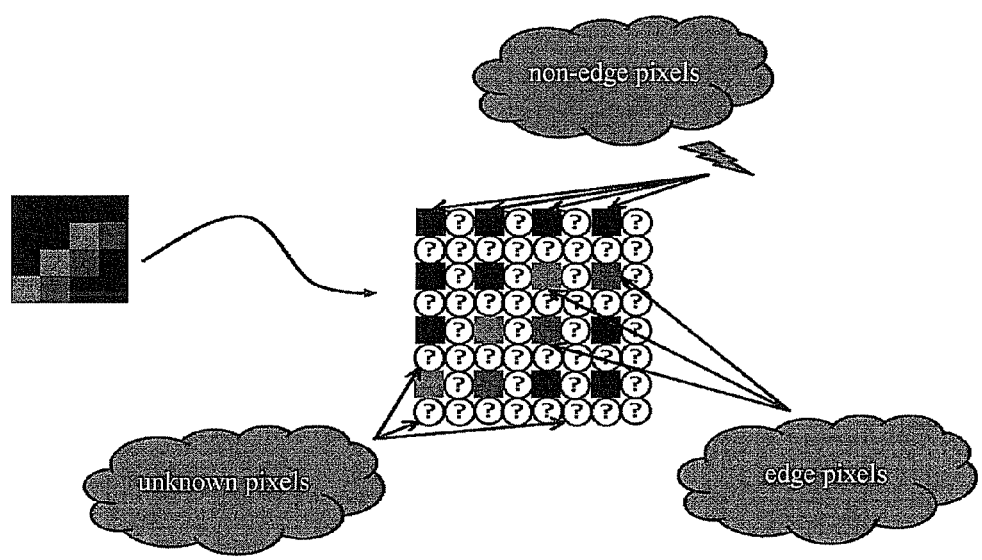
FIG. 2 schematically shows amplification of edge pixel frames.

FIG. 2 shows the schematic diagram of the amplification process. The large diagram at the right side of the figure is an amplified picture, wherein the pixels with question marks are the interpolated interpolation pixels (or also referred to as unknown pixels), and the interpolated pixels are firstly substituted by 0 grey scale.

The step is one of the main ideas of the application, in which, 2×2 amplification is directly performed on the edge pixel frames, and the key is to keep the same edge pixel information unchanged. With respect to the sawtooth problem, it can be solved by judging the types of the edges for compensation during the later interpolation, instead of smoothing the edge pixels. Therefore, the definition of the edge can be ensured.

In step S130, the interpolated interpolation pixels are compensated according to different pixel edges so as to obtain a high-resolution image.

Particularly, based on the central interpolation pixel in five interpolation to be compensated which is located at the center of a pixel block, the information of the edge pixels contained in the four pixels adjacent to the central interpolation pixel is searched according to the set four directions, and then the five interpolation pixels are compensated according to corresponding rules, wherein the rules are related to the number of the edge pixels contained in the four pixels, the edge directions, and/or brightness of the pixels.

The above interpolated 0-grey-scale pixels (interpolation pixels) are compensated. For not lowering the contrast of the edge pixel, the interpolation rules are optimized herein.

Figure 3:
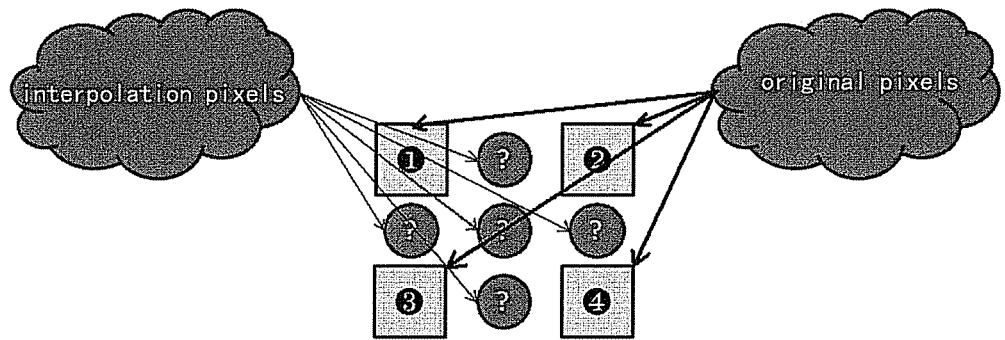
FIG. 3 schematically shows interpolation for the pixel block comprising five interpolation pixels to be compensated.

As shown in FIG. 3, interpolation is performed based on the central point indicated by the question mark. In the same time, the upper point, the lower point, the left point and the right point will also be compensated by interpolation. It should be noted that, the information of the pixels corresponding four vertexes, namely, the original pixel must be considered during interpolation. According to whether the vertex pixels are the edge pixels or not, the vertex pixels are optimized as follows, wherein the interpolation rules for optimization are varying from different situations.

(1) All the four vertexes are the edge pixels, and there are three different situations with respect to the edge brightness.

The rule under the first situation is the following: if all the four pixels are edge pixels, the edge are in diagonal directions, and the brightness of two pixels in the edge directions is approximate to the brightness of another pixel (the difference between the brightness values thereof is less than a set threshold value), then the interpolation compensation is performed by virtue of the following steps: assigning the average of brightness values of the three pixels to the central interpolation pixel located at the center of the pixel block; assigning the brightness values of other pixel except for the three pixels to the two interpolation pixels adjacent to the other pixel; and assigning the average of brightness values of each of the two pixels in the edge directions and the other pixel to the interpolation pixels therebetween.

Figure 4:
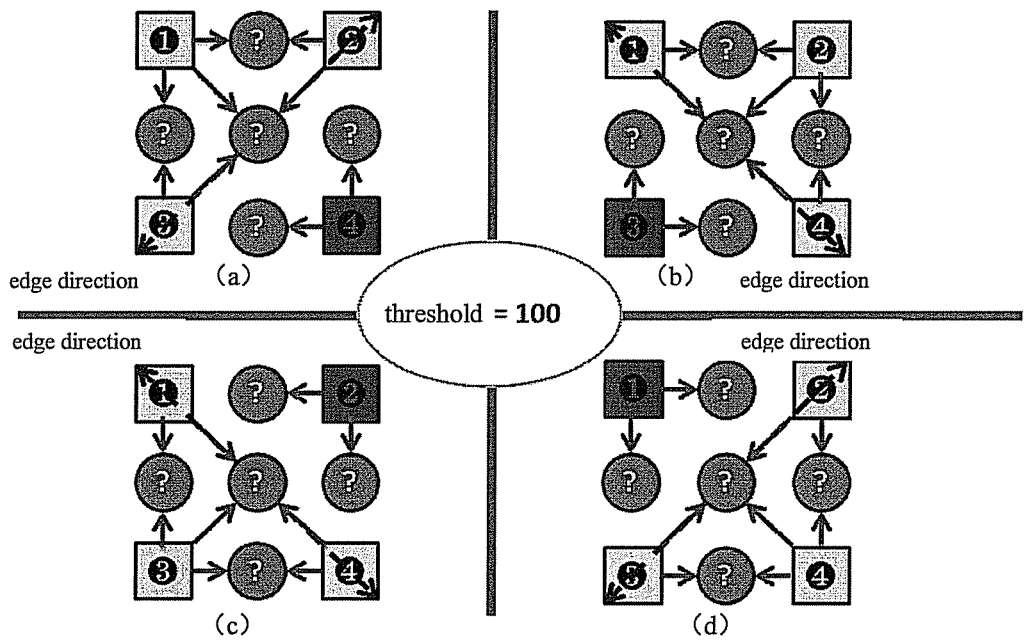
FIG. 4 schematically shows pixel compensation under the first situation that four vertexes of a pixel block are all edge pixels.

FIG. 4 is the schematic diagram showing pixel compensation under the first situation that the four vertexes of the pixel block are all edge pixels. Referring to FIG. 4, the edge directions are indicated in two-way arrows and the five interpolation pixels to be compensated by interpolation are indicated in question marks. Since there are four situations where the edges are in diagonal directions, which are shown in four areas (a), (b), (c) and (d) respectively. The following description is only for the situation of the upper left area (a), and the other situations are similar to this. If the brightness values of the three vertexes ①, ②, and ③ are close (if the threshold value for demarcation is 100), then the brightness value of the upper pixel indicated by the question mark is the average of the brightness values of the vertexes ① and ②; the brightness value of the left pixel indicated by the question mark is the average of the brightness values of the vertexes ① and ③; the brightness value of the middle pixel with the question mark is the average the brightness values of the vertexes ①, ②, and ③; and the brightness values of the right pixel with the question mark and the lower pixel with the question mark are equal to the brightness value of the vertex ④. By adopting the above rule, the color gamut between the both sides along each edge direction can be ensured consistent, so that the contrast at the edges of the images is enhanced, and thus making the outlines of the images clearer.

The rule under the second situation is the following: if all the four pixels are edge pixels, the brightness of two pixels in each row is approximate (the difference between the brightness values is less than a set threshold value), and the brightness difference between the upper row and the lower row is large (the difference of averages of the brightness values is greater than a set threshold value), than the interpolation compensation is performed by virtue of the following steps: assigning the average of the brightness values of two pixels in each row to the interpolation pixels in the row; assigning the average of the brightness values of two pixels in the lower row to the central interpolation pixel located at the center of the pixel block; and assigning the brightness value of each pixel in the two pixels in the lower row to the interpolation pixels in the column where the pixel is located.

Alternatively, if all the four pixels are edge pixels, the brightness values of two pixels in each column are approximate and the brightness difference between the left column and the right column is large, then the interpolation compensation is performed by virtue of the following steps: assigning the average of the brightness values of two pixels in each column to the interpolation pixels in the column; assigning the average of the brightness values of two pixels in the left column to the central interpolation pixel located at the center of the pixel block; and assigning the brightness value of each pixel in the two pixels in the left column to the interpolation pixels in the row where the pixel is located.

Figure 5:
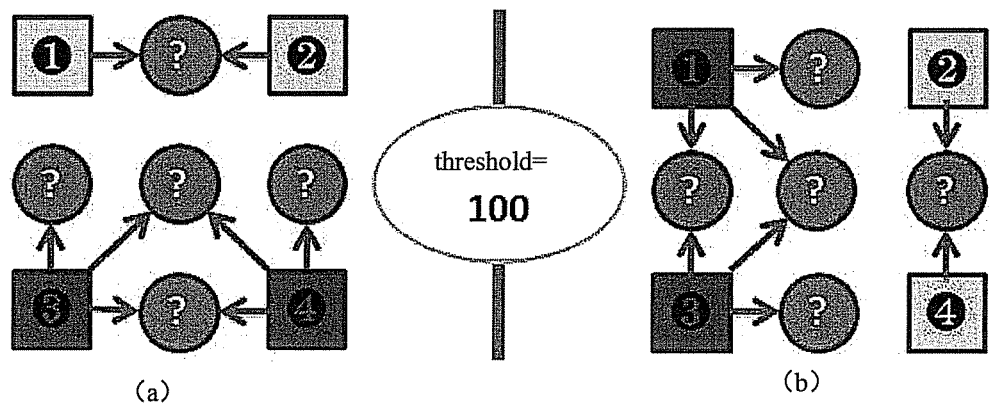
FIG. 5 schematically shows pixel compensation in the second situation when the four vertexes of the pixel block are all edge pixels.

Specifically, as shown in FIG. 5, there are two situations, which are shown in areas (a) and (b) respectively. The following description is only for the situation of left area (a), and the right area (b) is similar to this. When the brightness values of the vertexes ① and ② are close, the brightness values of the vertexes ③ and ④ are close and the brightness difference between the upper vertex and the lower vertex is large (the threshold value for demarcation is 100), then the brightness value of the upper pixel with the question mark is the average of the vertexes ① and ②; the brightness value of the lower pixel with the question mark is the average of the vertexes ③ and ④; the brightness value of the middle pixel with the question mark is the average of the vertexes ③ and ④; the brightness value of the left pixel with the question mark is equal to the brightness value of the vertex ③; and the brightness value of the right pixel with the question mark is equal to the brightness value of the vertex ④. By adopting the above rule, the color gamut of the upper pixels and lower pixels which are separated by the middle line can be ensured consistent.

The rule under the third situation is the following: if all the four pixels are edge pixels, and the brightness values of the four pixels are close or not close (the difference is less or greater than a set threshold value), then the interpolation compensation is performed by virtue of the following steps: assigning the average of the brightness values of two pixels in each column to the interpolation pixels in the column; assigning the average of the brightness values of two pixels in each row to the interpolation pixels in the row; and assigning the average of the brightness values of the four pixels to the central interpolation pixel located at the center of the pixel block.

Figure 6:
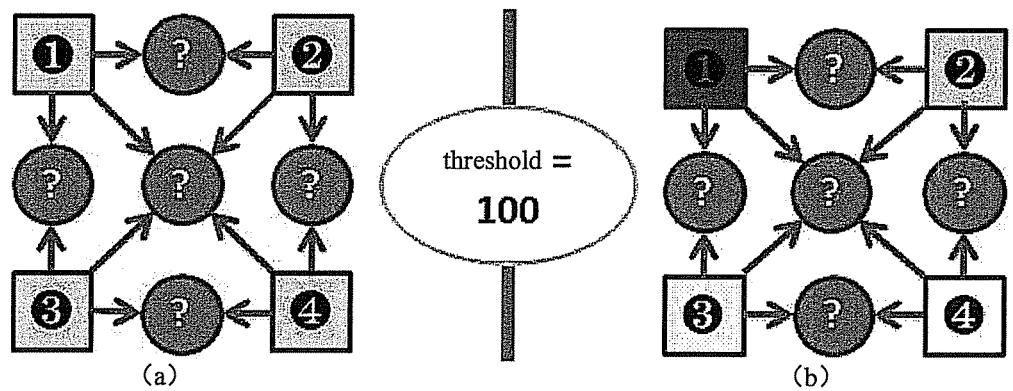
FIG. 6 schematically shows pixel compensation in the third situation when the four vertexes of the pixel block are all edge pixels.

Specifically, as shown in FIG. 6, there are two situations that the brightness is approximate and the brightness is not approximate, which are shown in areas (a) and (b) respectively. The following description is only for the left pixel block (a). If the brightness values of the vertexes ①, ②, ③, and ④ are close (the threshold value takes 100 for definition), the brightness values of the upper, lower, left and right pixels with the question marks are the average of the brightness values of the upper and lower original pixels or the left and right original pixels; and the brightness value of the middle pixel with the question mark is the average of the brightness values of the vertexes ①, ②, ③, and ④. As shown in the right pixel block (b) of FIG. 6, when the brightness values of the vertexes ①, ②, ③, and ④ are not close (the threshold value for demarcation is 100 for example), the rule is similar to the above.

(2) The three vertexes are the edge pixels, and the other one is not the edge pixel.

The rules under this situation is the following: if the number of edge pixels in the four pixels is three, and the edge are in diagonal directions, then the interpolation compensation is performed by virtue of the following steps: assigning the average of the brightness values of the three pixels to the central interpolation pixel located at the center of the pixel block; assigning the brightness value of other non-edge pixel except for the three pixels to the two interpolation pixels adjacent to the non-edge pixel; and assigning the average of the brightness values of each of the two pixels in the edge directions and another edge pixel except for the two edge pixels to the interpolation pixels therebetween.

Figure 7:
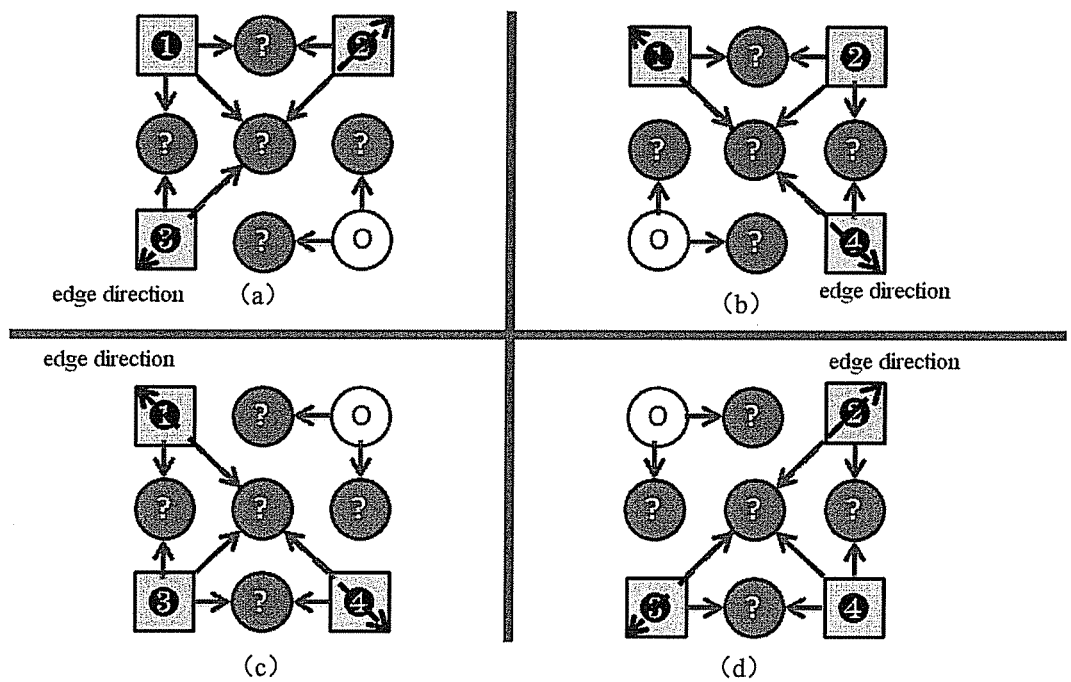
FIG. 7 schematically shows pixel compensation when the three vertexes of the pixel block are edge pixels.

Specifically, as show in FIG. 7, with respect to the edges in diagonal directions, there are four situations, which are shown in four areas (a), (b), (c) and (d) respectively. The following description is only for the upper left area (a), and the other situations are similar to this. The brightness value of the upper pixel with the question mark is the average of the brightness values of the vertexes ① and ②; the brightness value of the left pixel with the question mark is the average of the brightness values of the vertexes ① and ③; the brightness value of the middle pixel with the question mark is the average of the brightness values of the vertexes ①, ②, and ③; and the brightness values of the lower and right pixels with the question marks is the brightness value of the original lower right pixel. By adopting the above rule, the color gamut of both sides separated by the edge directions can be ensured consistent.

(3) The two vertexes are the edge pixels, and the other two are not the edge pixels.

The rule under this situation is the following: if the number of edge pixels in the four pixels is two, and the edge directions are diagonal directions, then the interpolation compensation is performed by virtue of the following steps: assigning the average of the brightness values of the two pixels to the central interpolation pixel located at the center of the pixel block; and assigning the brightness value of each of two other non-edge pixels to the interpolation pixels adjacent to the two other non-edge pixels.

Alternatively, if the number of edge pixels in the four pixels is two, and the edge are in column directions, then the interpolation compensation is performed by virtue of the following steps: assigning the brightness average of the two edge pixels to the interpolation pixels in the column where the two pixels are located; assigning the average of the brightness values of two other non-edge pixels to the central interpolation pixel located at the center of the pixel block; and assigning the brightness value of each of the two other non-edge pixels to the interpolation pixels adjacent to the two other non-edge pixels.

Figure 8:
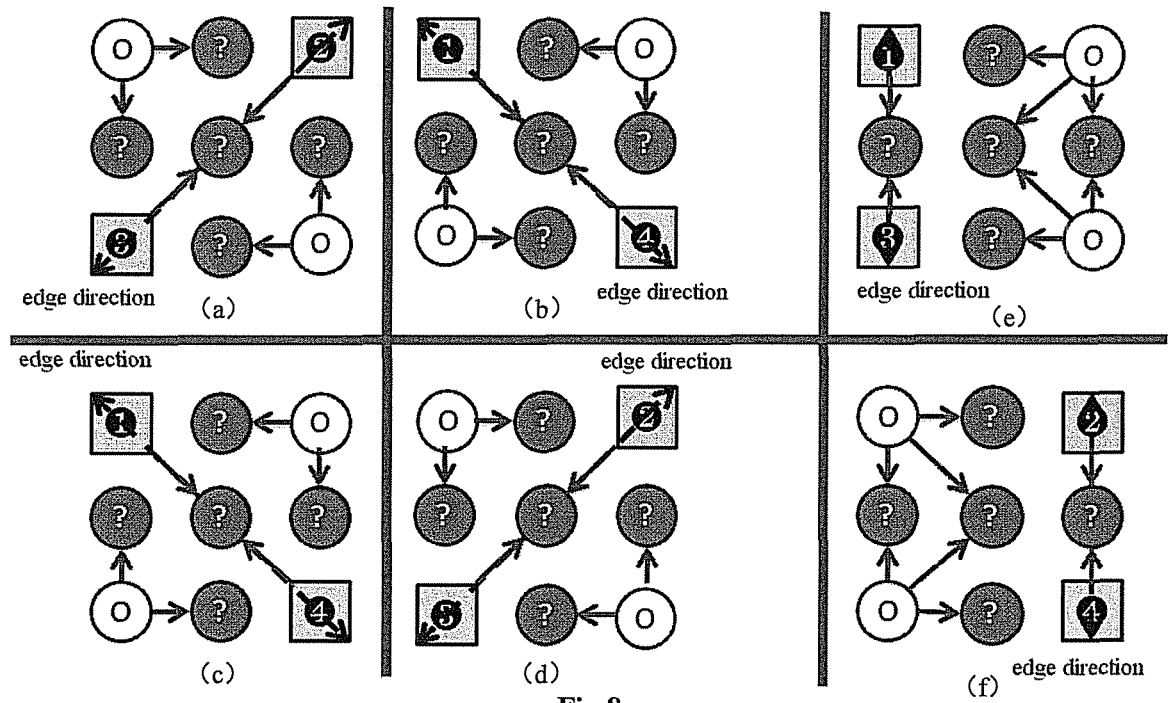
FIG. 8 schematically shows pixel compensation when the two vertexes of the pixel block are edge pixels.

Specifically, as shown in FIG. 8, with respect to the edges in diagonal direction, there are four situations, which are shown in four areas (a), (b), (c), and (d) respectively. With respect to the edges in column directions, there are two situations, which are shown in (e) and (f) respectively. The following description is only for the upper left area (a), and the other situations are similar to this. The brightness value of the middle pixel with the question mark is the average of the brightness values of the vertexes ② and ③; the brightness values of the upper and left pixels with the question marks is equal to the brightness value of the upper left original pixel; and the brightness values of the lower and right pixels with the question marks is equal to the brightness value of the lower right original pixel. The aim is to keep the consistency of the edge pixels and increase the contrast of pixels at the edges.

Although the above-mentioned rules are optimization, during actual interpolation compensation, the rules are mutually exclusive with the previous rules or the next rule. In order to cover each direction as much as possible, set directions need to be selected for the mutual exclusivity analysis of the rules. The selected preferred directions comprise 0 degree, 22.5°, 45°, 67.5°, 90°, 112.5°, 135°, and 157.5°.

Then, step S130 further comprises the following steps: recording the five interpolation pixels after interpolation compensation every time, selecting set directions for a analysis of mutual exclusivity, judging whether the assigned values of the five interpolation pixels currently compensated are mutually exclusive with the assigned values previously compensated, and processing the mutually exclusive interpolation pixels.

Specifically, when the set directions are selected in a range from 45° to 90°, if the assigned value to one of the five interpolation pixels currently compensated is also from interpolation pixels previously compensated, and the pixel block previously compensated is located above the interpolation pixel, then the assigned value of the interpolation pixel is the value currently compensated. If the assigned value to one of the five interpolation pixels currently compensated is also from one of interpolation pixels previously compensated, and the pixel block compensated previously is located at the left side of the interpolation pixel, then the assigned value of the interpolation pixel is the value previously compensated.

In another example, when the set directions are selected in a range from 90° to 180°, if the assigned value to one of the five interpolation pixels currently compensated is also from one of interpolation pixels previously compensated, and the pixel block compensated previously is located above the interpolation pixel, then the assigned value of the interpolation pixel is the previously compensated value. If the assigned value to one of the five interpolation pixels currently compensated is also from one of interpolation pixels previously compensated, and the pixel block compensated previously is located at the left side of the interpolation pixel, then the assigned value of the interpolation pixel is the value currently compensated.

In addition, when the set directions are selected from outside of a range of 45° to 180°, if the assigned value to one of the five interpolation pixels currently compensated is also from one of interpolation pixels previously compensated, and the pixel block compensated previously is located above or at the left side of the interpolation pixel, then the previously compensated value is assigned to the interpolation pixel.

An example is illustrated below for further illustration of the mutual exclusivity analysis.

Figure 9:
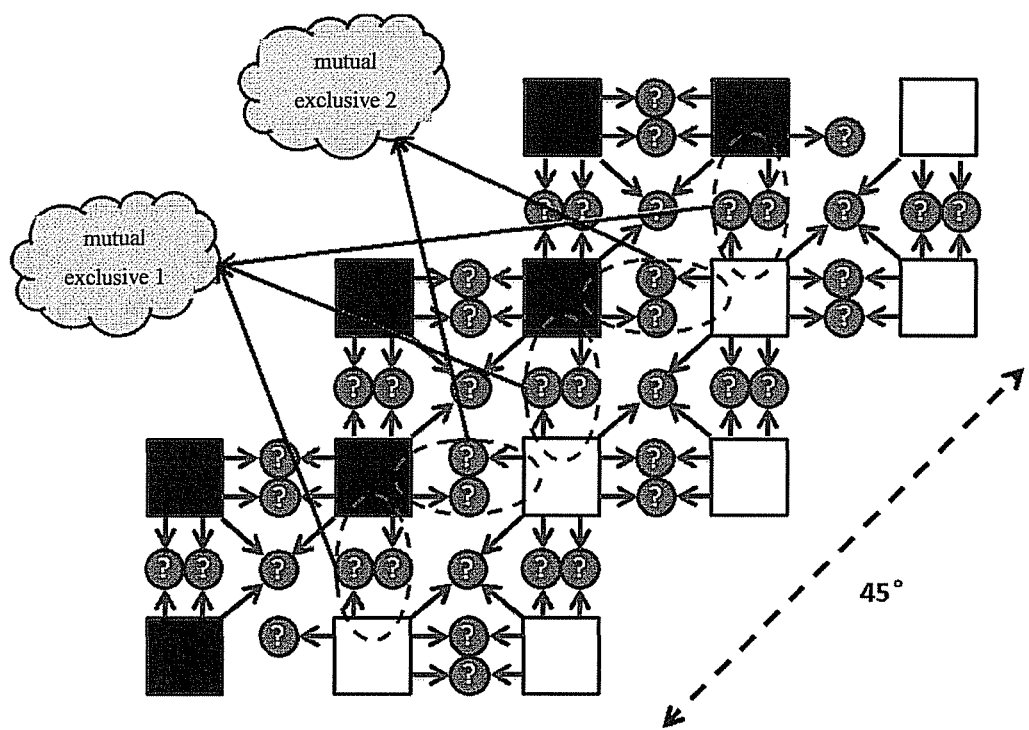
FIG. 9 schematically shows mutual exclusion according to the rule in the 45° direction.

The 45° direction is taken as an example, as shown in FIG. 9.

With respect to mutual exclusion 1, it is caused by that when the centre of the left four vertexes are taken as interpolation central points, the brightness value of the right pixel with the question mark is equal to the brightness value of the lower right pixel; and when the centre of the right four vertex are taken as interpolation central points, the brightness value of the left pixel with the question mark is equal to the brightness value of the upper left pixel. However, the two interpolation compensations are performed on the same pixel point, and thus results in the above mutual exclusion 1. In order to avoid a conflict, it is necessary to optimize the rule further. Thus, a method is provided, wherein, if the process of interpolation for the five pixels with the question marks is performed once, then the process is recorded and saved. The saved process data are used for rules comparison during the subsequent interpolation. If mutual exclusion generated during interpolation for a certain point is found during rules comparison, then the previous rule is unchanged. Due to the optimization of rules, the consistency of the edge can be ensured. Mutual exclusion 2 is the mutual exclusion of the upper rule and the lower rule of the pixels, and the optimization for rules is similar to the above.

When the set directions are in direction of 45° and 90°, and mutual exclusion exists between the upper rule and the lower rule, the subsequent rule remains unchanged;

When the set directions are in direction of 90°-180°, and mutual exclusion exists between the left rule and the right rule, the subsequent rule remains unchanged;

When the set directions are other situations, and mutual exclusion exists between the upper rule and the lower rule, or between the left rule and the right rule, the previous rule remains unchanged.

In addition, there are still some uncompensated pixels except the compensated interpolation pixels according to the above rules. It is preferable to compensate the remaining interpolation pixels by using a bicubic interpolation method.

In conclusion, according to the method disclosed by the present disclosure, the edge in four directions is firstly performed on the received image data by virtue of four groups of Sobel operators to obtain edge pixels, in which the fake edge pixels are discarded through a comparison to a threshold value, so as to ensure the correctness of the edge information; then the frame pictures of the edge images are amplified, with the interpolated pixel parts being substituted by 0 grey scale and the edge pixel information being directly reserved, so as to ensure the definition and integrity of edges, and enhance the contrast of pictures without degrading the quality of images; then the interpolation compensation is performed on the previously compensated 0-grey-scale pixels by using the optimized rule, during which the influences of the edge pixels and surrounding pixels are comprehensively considered.

Figure 10:
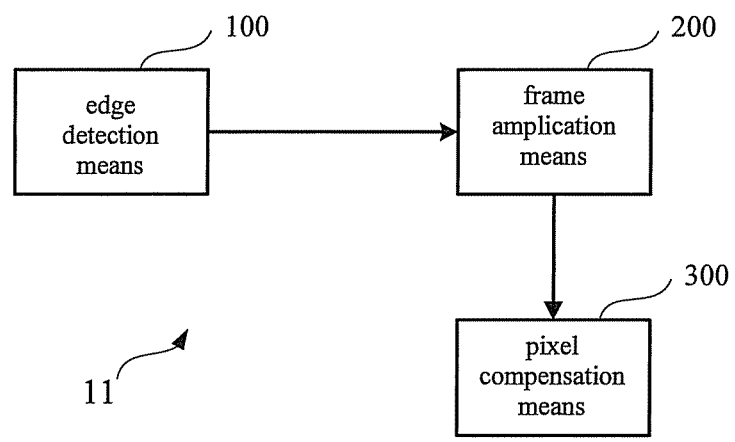
FIG. 10 schematically shows a structural diagram of a image super-resolution reconstruction system 11 according to examples of the present disclosure.

The present disclosure further provides an image super-resolution reconstruction system 11, specifically as shown in FIG. 10.

The image super-resolution reconstruction system 11 comprises: an edge detection means 100, a frame amplification means 200 connected with the edge detection means 100, and a pixel compensation means 300 connected with the frame amplification means 200.

Wherein, the edge detection means 100 is configured to detect an edge of low-resolution images to be processed to obtain edge pixel frames. Specifically, the edge detection means 100 is configured to detect the edges of each low-resolution image to be processed in four different directions by virtue of a Sobel operator.

The frame amplification means 200 is configured to keep the detected edge pixel information unchanged, and perform interpolation amplification on the edge pixel frames so that the amplified image is the double of the original edge pixel frame in size in both the horizontal direction and the vertical direction.

The pixel compensation means 300 is configured to compensate for the interpolated interpolation pixels according to different pixel edges to obtain a high-resolution image.

Specifically, the pixel compensation means 300 further searches, based on the central interpolation pixel in five interpolation pixels to be compensated which is located at the center of a pixel block, the information of the edge pixels contained in the four pixels adjacent to the central interpolation pixel in the set four directions, and then compensating for the five interpolation pixels according to corresponding rules, wherein the rules are related to the number of the edge pixels contained in the four pixels and the edge directions and/or brightness information.

With respect to different situations, the pixel compensation means 300 is operated in different ways of interpolation compensation.

Specifically, if all the four pixels are edge pixels, the edges are in diagonal directions, and the brightness of two pixels in the edge directions is approximate to the brightness of another, then the pixel compensation means 300 executes the steps as follows:

assigning the average of the brightness values of the three pixels to the central interpolation pixel located at the center of the pixel block; assigning the brightness value of the other pixel except the three pixels to the two interpolation pixels adjacent to the other pixel; and assigning the average of the brightness values of each of the two pixels in the edge directions and the other pixel to the interpolation pixels therebetween.

If all the four pixels are edge pixels, the brightness values of two pixels are close, and the difference between the brightness values of the upper row and the lower row is large, then the interpolation compensation is performed by virtue of the following steps:

assigning the brightness average of two pixels in each row to the interpolation pixels in the row; assigning the brightness average of two pixels in the lower row to the central interpolation pixel located at the center of the pixel block; and assigning the brightness value of each pixel in the two pixels in the lower row to the interpolation pixels in the column where the pixel is located.

If all the four pixels are edge pixels, the brightness of two pixels in each column is approximate, and the difference between the brightness values of the left row and the right row is large, then the interpolation compensation is performed by virtue of the following steps:

assigning the brightness average of two pixels in each column to the interpolation pixels in the column; assigning the brightness average of two pixels in the left column to the central interpolation pixel located at the center of the pixel block; assigning the brightness value of each pixel in the two pixels in the left column to the interpolation pixels in the row the pixel is located.

If all the four pixels are edge pixels, the brightness of the four pixels is close to each other or not, then the interpolation compensation is performed by virtue of the following steps:

assigning the brightness average of two pixels in each column to the interpolation pixels in the column; assigning the brightness average of two pixels in each row to the interpolation pixels in the row; and assigning the brightness average of the four pixels to the central interpolation pixel located at the center of the pixel block.

If the number of edge pixels in the four pixels is three, and the edge directions are diagonal directions, then the interpolation compensation is performed by virtue of the following steps:

assigning the brightness average of the three pixels to the central interpolation pixel located at the center of the pixel block; assigning the brightness value of the other non-edge pixel except the three pixels to the two interpolation pixels adjacent to the non-edge pixel; and assigning the brightness average of each of the two pixels in the edge directions and another edge pixel except the two edge pixels to the interpolation pixels therebetween.

If the number of edge pixels in the four pixels is two, and the edge directions are diagonal directions, then the interpolation compensation is performed by virtue of the following steps:

assigning the brightness average of the two pixels to the central interpolation pixel located at the center of the pixel block; and assigning the brightness value of each of the other two non-edge pixels to the interpolation pixels adjacent to the non-edge pixel.

If the number of edge pixels in the four pixels is two, and the edges are in column directions, then the interpolation compensation is performed by virtue of the following steps:

assigning the brightness average of the two edge pixels to the interpolation pixels in the column where the two pixels are located; assigning the brightness average of other two non-edge pixels to the central interpolation pixel located at the center of the pixel block; and assigning the brightness value of each of the other two non-edge pixels to the interpolation pixels adjacent to the non-edge pixel.

In addition, the pixel compensation means 300 further performs the following: recording the five interpolation pixels after interpolation compensation every time, selecting set directions so as to conduct a mutual exclusivity analysis, for judging whether the assigned values of the five interpolation pixels currently compensated are mutually exclusive with the assigned values previously compensated, and processing the mutually exclusive interpolation pixels.

When the set directions are selected in a range from 45° to 90°, if the assigned value to one of five interpolation pixels currently compensated is also from interpolation pixels previously compensated, and the pixel block compensated previously is located above the interpolation pixel, then the assigned value of the interpolation pixel is the value currently compensated; and if the assigned value to one of the five interpolation pixels currently compensated is also from one of interpolation pixels previously compensated, and the pixel block compensated previously is located at the left side of the interpolation pixel, then the assigned value of the interpolation pixel is the value previously compensated.

When the set directions are selected in a range from 90° to 180°, if the assigned value to one of the five interpolation pixels currently compensated is from one of interpolation pixels previously compensated and the pixel block compensated previously is located above the interpolation pixel, then the assigned value of the interpolation pixel is the value previously compensated; and if the assigned value to one of the five interpolation pixels currently compensated is from one of interpolation pixels previously compensated, and the pixel block compensated previously is located at the left side of the interpolation pixel, then the assigned value of the interpolation pixel is the value currently compensated.

When the set directions are selected from outside of a range from 45° to 180°, if the assigned value to one of the five interpolation pixels currently compensated is from one of interpolation pixels previously compensated, and the pixel block compensated previously is located above or at the left side of the interpolation pixel, then the assigned value of the interpolation pixel is the value previously compensated.

In addition, the pixel compensation means 300 is further used for executing the following operations: performing interpolation compensation on the remaining interpolation pixels by adopting a bicubic interpolation method.

It should be understood by those skilled in the art that each module or each step aforementioned of the present disclosure can be implemented by a general computing device. The modules or the steps can be integrated in one single computing device or distributed on a network composed of a plurality of computing devices. Optionally, the modules or the steps can be implemented by the executable program codes of a computing device so as to be stored in a storage device and executed by the calculation device. Alternatively, each or multiple of are made into integrated circuit modules respectively. As such, the present disclosure is not limited to the combination of any specific hardware and software.

The foregoing are merely preferred specific embodiments, but the present disclosure is not limited to this. Any changes or alternatives conceived by the one skilled in the art after reading the content disclosed herein fall within the scope of the present disclosure. Accordingly, the scope of the present disclosure will be defined in the accompanying claims.

The invention claimed is:

1. An image super-resolution reconstruction method, comprising:
    an edge detection step of performing an edge detection on low-resolution images to be processed to obtain edge pixel frames;
    a frame amplification step of amplifying the edge pixel frames so that each amplified image is the double of the original edge pixel frame in size in both horizontal direction and vertical direction, without changing the detected edge pixel information; and
    a pixel compensation step of compensating for the interpolated interpolation pixels according to different pixel edges to obtain a high-resolution images;
    wherein, the pixel compensation step further comprises:
    searching, based on the central interpolation pixel in five interpolation pixels to be compensated which is located at the center of a pixel block, the information of the edges pixels contained in the four pixels adjacent to the central interpolation pixel in set four directions, and then compensating for the five interpolation pixels accordirato corresponding rules, and
        wherein, the rules are related to the number of the edge pixels contained in the four pixels,the edge directions, and/or brightness of the pixels:
    wherein, when the set directions are selected in a range from 45° to 90° ,
        if the assigned value to one of the five interpolation pixels currently compensated is also from interpolation pixels previously compensated, and the pixel block compensated previously is located above the interpolation pixel, then the assigned value of the interpolation pixel is the value currently compensated, and,
        if the assigned value to one of the five interpolation pixels currently compensated is also from one interpolation pixels previously compensated, and the pixel block compensated previously is located at the left side of the interpolation pixel, then the assigned value of the interpolation pixel is the value previously compensated;

wherein, when the set directions are selected in a range from 90° to 180°, if the assigned value to one of the five interpolation pixels currently compensated is also from one of interpolation pixels previously compensated, and the pixel block compensated previously is located above the interpolation pixel, then the assigned value of the interpolation pixel is the value previously compensated, and if the assigned value to one of the five interpolation pixels currently compensated is also from one of interpolation pixels previously compensated, and the pixel block compensated previously is located at the left side of the interpolation pixel, then the assigned value of the interpolation pixel is the value currently compensated; and wherein, when the set directions are selected from outside of a range of 45° to 180°, if the assigned value to one of the five interpolation pixels currently compensated is from one of interpolation pixels previously compensated, and the pixel block compensated previously is located above or at the left side of the interpolation pixel, then the assigned value of the interpolation pixel is the value previously compensated.

2. The method according to claim 1, wherein, in the edge detection step, the edges of each low-resolution image to be processed are further detected from four different directions by adopting a Sobel operator.

3. The method according to claim 1, wherein, the rules comprise: if all the four pixels are edge pixels, the edge are in diagonal directions, and the difference of brightness between the two pixels in the edge directions and the other pixel is less than a set threshold value, then the interpolation compensation is performed by virtue of the following steps:

assigning the average of brightness values of the three pixels to the central interpolation pixel located at the center of the pixel block; assigning the brightness value of other pixel except for the three pixels to the two interpolation pixels adjacent to the other pixel; and assigning the average of brightness values of each of the two pixels in the edge directions and the other pixel to the interpolation pixel therebetween.

4. The method according to claim 1, wherein, the rules comprise: if all the four pixels are edge pixels, the difference of brightness values between the two pixels in each row is less than a set threshold value, and the difference of the averages of brightness values of the two adjacent rows is greater than the set threshold value, then the interpolation compensation is performed by virtue of the following steps:

assigning the brightness average of two pixels in each row to the interpolation pixels in the corresponding row; assigning the brightness average of two pixels in the lower row to the central interpolation pixel located at the center of the pixel block; and assigning the brightness value of each pixel in the two pixels in the lower row to the interpolation pixels in the column where each pixel in the two pixels is located.

5. The method according to claim 1, wherein, the rules comprise: if all the four pixels are edge pixels, and the brightness difference value between the two pixels in each column is less than a set threshold value and the difference of the brightness averages of the left column and the right column is greater than the set threshold value, then the interpolation compensation is performed by virtue of the following steps:

assigning the brightness average of two pixels in each column to the interpolation pixels in the column; assigning the brightness average of two pixels in the left column to the central interpolation pixel located at the center of the pixel block; assigning the brightness value of each pixel in the two pixels in the left column to the interpolation pixels in the row where the pixel is located.

6. The method according to claim 1, wherein, the rules comprise: if all the four pixels are edge pixels, and the difference between the brightness values of the four pixels is less than a set threshold value or greater than the set threshold value, then the interpolation compensation is performed by virtue of the following steps:

assigning the average of the brightness values of two pixels in each column to the interpolation pixels in the column; assigning the average of the brightness values of two pixels in each row to the interpolation pixels in the row; and assigning the average of the brightness values of the four pixels to the central interpolation pixel located at the center of the pixel block.

7. The method according to claim 1, wherein, the rules comprise: if the number of edge pixels in the four pixels is three, and the edges are in a diagonal direction, then the interpolation compensation is performed by virtue of the following steps:

assigning the average of the brightness values of the three pixels to the central interpolation pixel located at the center of the pixel block; assigning the brightness values of other non-edge pixels except the three pixels to the two interpolation pixels adjacent to the non-edge pixel; and assigning the average of the brightness values of each of the two pixels in the edge directions and another edge pixel except for the two edge pixels to the interpolation pixels therebetween.

8. The method according to claim 1, wherein, the rules comprise: if the number of edge pixels in the four pixels is two, and the edges are in a diagonal direction, then the interpolation compensation is performed by virtue of the following steps:

assigning the average of the brightness values of the two edge pixels to the central interpolation pixel located at the center of the pixel block; and assigning the brightness value of each of the other two non-edge pixels to the interpolation pixels adjacent to the non-edge pixel.

9. The method according to claim 1, wherein, the rules comprise: if the number of edge pixels in the four pixels is two, and the edges are in directions of columns, then the interpolation compensation is performed by virtue of the following steps:

assigning the brightness average of the two edge pixels to the interpolation pixels in the column where the two pixels are located; assigning the average of brightness values of other two non-edge pixels to the central interpolation pixel located at the center of the pixel block; and assigning the brightness value of each of the other two non-edge pixels to the interpolation pixels adjacent to the non-edge pixel.

10. The method according to claim 1, wherein, further including a step of compensating for the remaining interpolation pixels by adopting a bicubic interpolation method.

11. An image super-resolution reconstruction system, comprising:

an edge detection means, for performing an edge detection on low-resolution images to be processed to obtain edge pixel frames;

a frame amplification means for amplifying the edge pixel frames so that each amplified image is the double of the original edge pixel frame in size in both horizontal direction and vertical direction, without changing the detected edge pixel information; and a pixel compensation means for:

compensating for the interpolated interpolation pixels according to different pixel edges to obtain a high-resolution image;

searching, based on the central interpolation pixel five interpolation pixels to be compensated which is located at the center of a pixel block, the information of the edge pixels contained in the four pixels adjacent to the central interpolation pixel in set four directions, and then compensating for the five interpolation pixels according to corresponding rules, wherein the rules are related to the number of the edge pixels contained in the four pixels, the edges directions, and/or brightness of the pixels, and recording the five interplation pixels compensated every time, selects sets directions so as to conduct a mutual exclusivity analysis, for judging whether the assigned values to the five interpolation pixels currently compensated are mutually exclusive with the assigned values previously compensated, and processing the interpolation pixels which are mutually exclusive;

wherein, when the set directions are selected in a range from 45° to 90°, if the assigned value to one of the five interpolation pixels currently cormpensated is also from interpolation pixels previously compensated, and the pixel block compensated previously is loated above the interpolation pixel, then the assigned value of the interpolation pixel is the value currently compensated, and, if the assigned value to one of the five interpolation pixels currently compensated is also from one of interpolation pixels previously compensated, and the pixel bock compensated previously is located at the left side of the interpolation pixel, then the assigned value of the interpolation pixel is the value previous compensated;

wherein, when the set directions are selected in a range from 90° to 180°, if the assigned value to one of the five interpolation pixels currently compensated is also from one of interpolation pixels previously compensated, and the pixel block compensated previously is located above the interpolation pixel, then the assigned value of the interpolation pixel is the value previously compensated, and if the assigned value to one of the five interpolation pixels currently compensated is also from one of interpolation pixels previously compensated, and the pixel block compensated previously is located at the left side of the interpolation pixel, then the assigned value of the interpolation pixel is the value currently compensated; and wherein, when the set directions are selected from outside of a range of 45° to 180°, if the assigned value to one of the five interpolation pixels currently compensated is from one of interpolation pixels previously compensated, and the pixel block compensated previously is located above or at the left side of the interpolation pixel, then the assigned value of the interpolation pixel is the value peviously compensated.

12. The system according to claim 11, wherein, the edge detection means further detect the edges of each low-resolution image to be processed from four different directions by adopting a Sobel operator.

* * * * *